(12) United States Patent  
Reddy

(10) Patent No.: US 7,644,595 B2
(45) Date of Patent: Jan. 12, 2010

(54) COMBINED RECOVERY OF HYDROGEN AND HYDROCARBON LIQUIDS FROM HYDROGEN-CONTAINING GASES

(75) Inventor: Satish Reddy, Irvine, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 416 days.

(21) Appl. No.: 10/496,439

(22) PCT Filed: Dec. 17, 2002

(86) PCT No.: PCT/US02/40412

§ 371 (c)(1),
(2), (4) Date: May 15, 2006

(87) PCT Pub. No.: WO03/051482

PCT Pub. Date: Jun. 26, 2003

(65) Prior Publication Data

US 2006/0235256 A1    Oct. 19, 2006

Related U.S. Application Data

(60) Provisional application No. 60/342,262, filed on Dec. 18, 2001.

(51) Int. Cl.
*F25J 1/02* (2006.01)
(52) U.S. Cl. .............................. 62/619; 62/617; 62/618
(58) Field of Classification Search ........... 62/617–620; 585/800, 802
See application file for complete search history.

(56) References Cited

U.S. PATENT DOCUMENTS

| 5,178,751 A | * | 1/1993 | Pappas | 208/340 |
| 5,332,492 A | * | 7/1994 | Maurer et al. | 208/340 |
| 6,023,942 A | * | 2/2000 | Thomas et al. | 62/613 |

FOREIGN PATENT DOCUMENTS

WO    WO 00/37356    * 12/1999

OTHER PUBLICATIONS

Genereaux, R.P. et al. (1984). "Section 6: Transport and Storage of Fluids." Perry's Chemical Engineers' Handbook, 6th edition, edited by R.H. Perry and D. Green. McGraw Hill.*
Bendinelli, P. et al. (2001). "Compressor Performance-Dynamic." Compressor Handbook, edited by P.C. Hanlon. McGraw-Hill.*

* cited by examiner

Primary Examiner—Robert J Hill, Jr.
Assistant Examiner—Brian McCaig
(74) Attorney, Agent, or Firm—Fish & Associates, PC

(57) ABSTRACT

A pressure differential of a feed gas (110) between a compressor (120) and expander (160) is employed to cool the feed gas to condense and remove at least a portion of one component to produce a partially depleted feed gas from which another component may then be removed. In especially preferred aspects, the feed gas comprises $C_2$-$C_5$ hydrocarbons and hydrogen, wherein the hydrocarbons are condensed in the cooler and hydrogen is removed using a pressure swing adsorption unit (180).

17 Claims, 1 Drawing Sheet

COMBINED RECOVERY OF HYDROGEN AND HYDROCARBON LIQUIDS FROM HYDROGEN-CONTAINING GASES

This application claims the benefit of U.S. provisional patent application with the Ser. No. 60/342,262, which was filed Dec. 18, 2001, and which is incorporated herein by reference.

FIELD OF THE INVENTION

The field of the invention is gas processing.

BACKGROUND OF THE INVENTION

Numerous industrial processes, and especially processes in refineries and processing plants produce significant amounts of gaseous streams containing hydrogen and hydrocarbons. While in some known processes hydrogen and hydrocarbons from such streams are utilized as fuel, other known processes include a hydrogen recovery step (e.g., by employing a hydrogen PSA unit), and the resulting hydrogen-depleted hydrocarbon-containing stream is then utilized as a fuel. However, all or almost all of known processes fail to appreciate that hydrocarbons, and especially hydrocarbon liquids, may be recovered from hydrogen-containing gases in a energy efficient process. Therefore, there is still a need for improved configurations and methods in which hydrocarbons, and especially hydrocarbon liquids, are removed from a hydrogen-containing gas.

SUMMARY OF THE INVENTION

The present invention is directed to methods and configurations in which a pressure differential of a feed gas between a compressor and an expander is employed to cool the feed gas to condense and remove at least a portion of one component of the feed gas to thereby produce a partially depleted feed gas, and in which a second component is removed from the partially depleted feed gas using a pressure swing adsorption unit.

In one aspect of the inventive subject matter, a plant includes a compressor that compresses a feed gas comprising a first component and a second component (preferably to a pressure of about 470 psia to about 510 psia), thereby forming a compressed feed gas having a first pressure. A cooler cools the compressed feed gas to a temperature sufficient to condense at least part of the first component in the compressed feed gas, and a first separator separates the cooled compressed feed gas into a first vapor portion and a first liquids portion, wherein the vapor portion is expanded in an expander to a second pressure (preferably to a pressure of about 380 psia to about 420 psia) to form an expanded stream. A second separator separates the expanded stream into a second liquids portion and a second vapor portion, wherein the second vapor portion provides refrigeration of the compressed feed gas in the cooler.

Particularly preferred plants further comprise a pressure swing adsorption unit (most preferably a hydrogen pressure swing adsorption unit) that receives the second vapor portion to remove the second component from the feed gas, and it is especially contemplated that the first liquids portion is fed to the second separator, wherein the second liquids portion predominantly comprises the second component. In still further preferred plants, the compressor and the expander are mechanically coupled to each other, and the first component comprises a $C_2$-$C_5$ hydrocarbon, and the second component comprises hydrogen.

Thus, a pressure differential of a feed gas between a compressor and an expander is employed in contemplated plants to cool the feed gas to a temperature that is sufficient to condense at least a portion of a first component of the feed gas and to thereby produce a partially depleted feed gas, and in which a second component is removed from the partially depleted feed gas using a pressure swing adsorption unit. Particularly preferred pressure differentials in such plants are between about 70 psia and about 130 psia, and the first component comprises a $C_2$-$C_5$ hydrocarbon, and the second component comprises hydrogen. It is still further preferred that the partially depleted feed gas is used as refrigerant to cool the feed gas.

Consequently, a method of separating a first component and a second component from a feed gas will include one step in which the feed gas is compressed from pressure $P_0$ to pressure $P_1$, and further compressed from pressure $P_1$ to pressure $P_2$. In another step, the feed gas is cooled at pressure $P_2$ to a temperature sufficient to condense at least a portion of the first component of the feed gas, and in yet another step, the cooled feed gas is separated in a first separator into a first vapor portion and a first liquid portion comprising the first component, wherein the first vapor portion is expanded in an expander to pressure $P_1$, thereby producing a cooled expanded product. The cooled expanded product is then separated in a second separator into a second vapor portion comprising the second component and a second liquid portion comprising the first component, wherein the second vapor portion provides refrigeration for the cooling of the feed gas.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
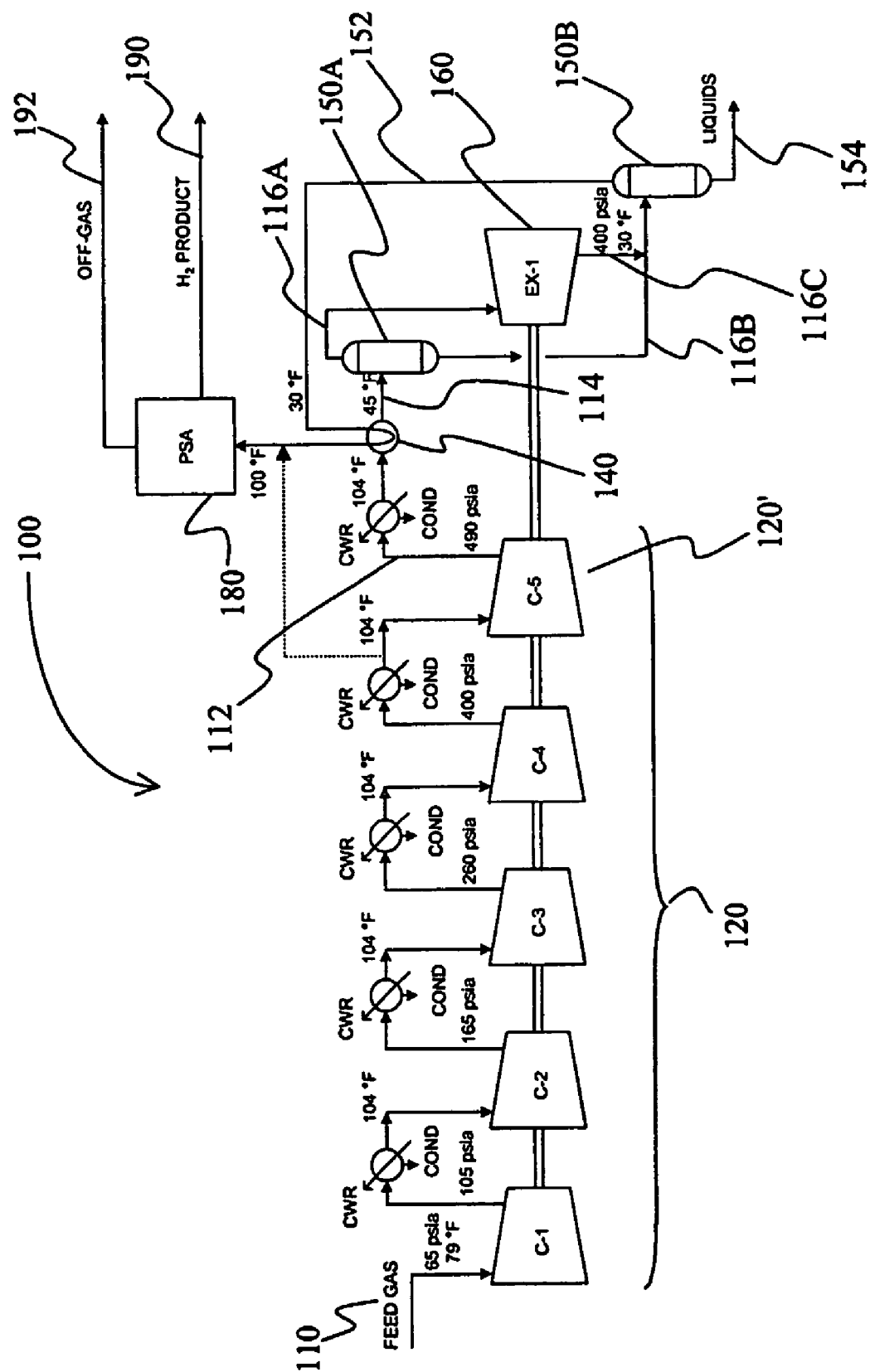
FIG. 1 is schematic view of a hydrogen and hydrocarbon liquids recovery plant according to the inventive subject matter.

The inventor discovered that a pressure differential (e.g., between a compressor and an expander) of a feed gas can be employed to remove at least a portion of one component of the feed gas to produce a partially depleted feed gas from which another component may then be removed (e.g., using a pressure swing adsorption unit) in a further processing step.

In one particularly contemplated aspect, a gas containing hydrogen and hydrocarbons is compressed to a first pressure $P_1$. The compressed gas is subsequently further compressed to a second pressure $P_2$. The compressed gas at $P_2$ is expanded in an expander to $P_1$, wherein $\Delta P$ (the pressure difference between $P_2$ and $P_1$) is sufficient to liquefy at least some of the hydrocarbon in the gas stream. A separator separates the liquefied hydrocarbon from the remaining compressed gas at $P_1$, which is then fed into a hydrogen PSA unit in which hydrogen is recovered from the remaining compressed gas.

While it is generally contemplated that $P_1$ may be any pressure above atmospheric pressure, it is preferred that $P_1$ is at least 50 psia, more typically at least 100 psia, and most typically between about 200 psia and about 700 psia. Similarly, $P_2$ will generally be in the range of about 400 psia to about 800 psia with $P_2 > P_1$. As used herein, the term "about" in conjunction with a numeral refers to the numeral and a deviation thereof in the range of +/−10% of the numeral. For example, the term "about 400 psia" refers to a range of 360 psia (inclusive) to 440 psia (inclusive).

An exemplary configuration 100 according to the inventive subject matter is depicted in FIG. 1, in which feed gas 110 having a pressure of about 65 psia is compressed in the compressor 120 over four stages to pressure $P_1$ (about 400 psia), and in a fifth stage 120' to pressure $P_2$ (about 490 psia). The compressed gas 112 is then cooled from about 104° F. in cooler 140 to a temperature of about 45° F. to form the cooled and compressed feed gas 114, thereby at least partially liquefying hydrocarbons contained in the cooled and compressed feed gas. The liquefied hydrocarbons 116B are removed from the cooled and compressed feed gas in a first separator 150A and are fed into second separator 150B. The cooled compressed vapor portion 116A leaving the first separator 150A at $P_2$ is expanded in expander 160 (coupled to the compressor 120 via drive shaft), and further liquefied hydrocarbons 116C from the cooled compressed vapor portion 116A are separated from the expanded feed gas in the second separator 150B. The liquid product 154 is removed from the second separator 150B, and the expanded hydrocarbon-depleted compressed gas 152 at pressure $P_1$ is employed to cool the compressed feed gas 112 in cooler 140. A hydrogen PSA unit 180 purifies the hydrocarbon-depleted compressed gas 152 and produces purified hydrogen 190 and tail gas 192.

It is generally contemplated that all gases containing hydrogen (typically 20-50 mol %, but other concentrations also contemplated) and hydrocarbons (typically $C_1$-$C_6$) are suitable. However, especially preferred gases are tail gases from a hydrogen PSA unit with a hydrogen content of about 50-60%. Further especially preferred gases include low pressure (i.e., below 100 psia) gases from petrol processing plants and/or refineries. It should further be appreciated that suitable gases may also comprise mixtures at any ratio of two or more gases containing hydrogen and/or hydrocarbons. Moreover, depending on the particular source of the feed gas, it should be recognized that the feed gas may comprise appreciable quantities of water (typically ranging from the several hundred ppm to saturation). Consequently, contemplated configurations may also include a dryer that removes at least part of the water contained in the feed gas. In preferred configurations, the dryer will be upstream of the expander, and most preferably upstream of the cooler.

While it is generally preferred that configuration and methods according to the inventive subject matter employ a gas stream that contains hydrogen and at least one hydrocarbon, it should be appreciated that all gas streams are appropriate that contain a first and a second gaseous component, wherein the second component (or at least part of the second component) liquefies when the gas stream is expanded from a higher pressure $P_2$ to a lower pressure $P_1$ (differential liquefaction). Thus alternative gases may also contain $CO_2$, $CH_4$, $O_2$, $N_2$, etc. as first and/or second component.

The compression of the feed gas from feed gas pressure to $P_1$, and from $P_1$ to $P_2$ may be performed in one or more stages, and it is especially preferred that the compressor stages are coupled to a common drive shaft. However, all known alternative manners of compressing gases are also contemplated. Similarly, the expander may be operated in a single stage or multiple stages. However, it is particularly preferred that the expander is a single stage coupled to the drive shaft of the compressor. With respect to the particular amounts of $P_1$ and $P_2$ it should be recognized that $P_1$ and $P_2$ will typically depend on the first and second gaseous component. Therefore, $P_1$ and $P_2$ may be in the range of between about atmospheric pressure and several hundred to several thousand psia, and more. It is generally contemplated, however, that $P_1$ is lower than $P_2$.

With respect to the separator, it should be recognized that the capacity and number of suitable separators may vary and will typically depend on the amount of feed gas to be processed. There are numerous separators known in the art, and all of them are considered suitable in conjunction with the teachings presented herein. The cooler cooling the compressed feed gas at P2 may or may not be included in alternative configurations and may be replaced with alternative cooling systems (using a refrigerant other than the gas expanded from $P_2$ to $P_1$). However, it should be recognized that contemplated systems and configurations will operate particularly efficiently when the refrigeration is provided by the expanded vapor portion. Consequently, especially preferred coolers will cool the compressed feed gas at pressure $P_2$ to a temperature between about 0° F. and about 70° F., more typically to a temperature between about 30° F. and about 55° F., and most typically to a temperature of about 45° F. It should still further be recognized that a particular configuration and volume of suitable PSA units will predominantly depend on the amount of feed gas. However, it is contemplated that all suitable PSA units may be employed in contemplated methods and configurations. Especially preferred PSA units are one or more hydrogen PSA units, which may be operated serially or in parallel.

Thus, it should be particularly appreciated that various advantages are achieved by the configuration and methods presented herein, and particularly significant advantages include recovery of hydrocarbon liquids as a process product that would otherwise be lost as fuel, and reduction in size of the hydrogen PSA unit (due to (a) decreased gas volume after removal of liquefied hydrocarbons and (b) increased partial pressure of hydrogen after removal of liquefied hydrocarbons).

It should also be noted that the recovery of hydrocarbon liquids requires only minor amounts of additional energy (i.e., cost), since the bulk of power is spent in compressing the feed gas from feed gas pressure ($P_0$, typically between atmospheric pressure and about 200 psia) to $P_1$. Further compression of the compressed feed gas from $P_1$ to $P_2$ typically requires only a fraction of the power required for compression from $P_0$ to $P_1$ (e.g., about 10% in a configuration as shown in FIG. 1). Moreover, energy can be recovered in the expander, which will further reduce the power required for compression from $P_1$ to $P_2$ (e.g., to about 5% in a configuration as shown in FIG. 1).

Consequently, the inventors contemplate a plant that includes (1) a compressor that compresses a feed gas comprising a first component and a second component, thereby forming a compressed feed gas having a first pressure, (2) a cooler that cools the compressed feed gas to a temperature sufficient to condense at least part of the first component in the compressed feed gas, (3) a first separator that separates the cooled compressed feed gas into a first vapor portion and a first liquids portion, wherein the first vapor portion is expanded in an expander to a second pressure to form an expanded stream, and (4) a second separator that separates the expanded stream into a second liquids portion and a second vapor portion, wherein the second vapor portion provides refrigeration of the compressed feed gas in the cooler.

In such configurations, it is especially preferred that a pressure swing adsorption unit receives the second vapor portion to remove the second component from the feed gas, wherein the first liquids portion is fed to the second separator, and wherein the second liquids portion predominantly comprises the second component. While it is generally contemplated that first components may comprise numerous hydrocarbons (typically between $C_1$ and $C_{30}$), particularly preferred first components comprise a $C_2$-$C_5$ hydrocarbon, and preferred second components comprise hydrogen. Moreover, it is generally preferred that in such configurations the compressor compresses the feed gas to a pressure of about 470 psia to about 510 psia, and the expander expands the compressed feed gas to a pressure of about 380 psia to about 420 psia.

Thus, viewed from another perspective, contemplated plants will include a pressure differential of a feed gas between a compressor and an expander, wherein the pressure differential is employed to cool the feed gas to a temperature that is sufficient to condense (and remove) at least a portion of a first component of the feed gas and to thereby produce a partially depleted feed gas, and in which a second component is removed from the partially depleted feed gas using a pressure swing adsorption unit. Preferred pressure differentials are typically between about 70 psia and about 130 psia, wherein the first component comprises a $C_2$-$C_5$ hydrocarbon, and wherein the second component comprises hydrogen.

Thus, specific embodiments and applications for combined recovery of hydrogen and hydrocarbon liquids from hydrogen-containing gases have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a compressor that is configured to compress a feed gas comprising a first component and a second component, and to thereby form a compressed feed gas having a first pressure;
   a cooler coupled to the compressor, wherein the cooler is configured to receive and cool the compressed feed gas to a temperature sufficient to condense at least part of the first component in the compressed feed gas;
   a first separator that is configured to separate the cooled compressed feed gas into a first vapor portion and a first liquids portion, and an expander that is configured to expand the first vapor portion to a second pressure to thereby allow formation of an expanded stream; and
   a second separator that is configured to separate the expanded stream into a second liquids portion and a second vapor portion, wherein the cooler is configured to allow the second vapor portion to provide refrigeration to the compressed feed gas.

2. The plant of claim 1 further comprising a pressure swing adsorption unit that is configured to receive the second vapor portion to allow for removal of the second component from the feed gas.

3. The plant of claim 2 wherein second separator is configured to receive the first liquids portion, and wherein the second liquids portion predominantly comprises the second component.

4. The plant of claim 3 wherein the compressor and the expander are mechanically coupled to each other.

5. The plant of claim 3 wherein the first component comprises a $C_2$-$C_5$ hydrocarbon, and wherein the second component comprises hydrogen.

6. The plant of claim 5 wherein the pressure swing adsorption unit comprises a hydrogen pressure swing adsorption unit.

7. The plant of claim 1 wherein the compressor is configured to compress the feed gas to a pressure of about 470 psia to about 510 psia, and wherein the expander is configured to expand the compressed feed gas to a pressure of about 380 psia to about 420 psia.

8. A plant that is configured to allow use of a pressure differential of a feed gas between a compressor and an expander to thereby allow for cooling the feed gas to a temperature that is sufficient to condense at least a portion of a first component of the feed gas and to thereby produce a partially depleted feed gas, wherein the plant is further configured to allow removal of a second component of the feed gas from the partially depleted feed gas using a pressure swing adsorption unit.

9. The plant of claim 8 wherein the pressure differential is between about 70 psia and about 130 psia.

10. The plant of claim 9 wherein the first component comprises a $C_2$-$C_5$ hydrocarbon, and wherein the second component comprises hydrogen.

11. The plant of claim 10 wherein the plant is further configured to allow use of the partially depleted feed gas as refrigerant for cooling of the feed gas.

12. The plant of claim 10 wherein the pressure swing adsorption unit is a hydrogen pressure swing adsorption unit.

13. A method of separating a first component and a second component from a feed gas, comprising:
   compressing the feed gas from pressure $P_0$ to pressure $P_1$, and further compressing the feed gas from pressure $P_1$ to pressure $P_2$;
   cooling the feed gas at pressure $P_2$ to a temperature sufficient to condense at least a portion of the first component of the feed gas;
   separating the cooled feed gas in a first separator into a first vapor portion and a first liquid portion comprising the first component, and expanding the first vapor portion in an expander to pressure $P_1$, thereby producing a cooled expanded product; and
   separating the cooled and expanded product in a second separator into a second vapor portion comprising the second component and a second liquid portion comprising the first component, wherein the second vapor portion provides refrigeration for the cooling of the compressed feed gas at pressure $P_2$.

14. The method of claim 13 wherein pressure $P_0$ is between about atmospheric pressure and about 200 psia.

15. The method of claim 14 wherein pressure $P_1$ is between about 200 psia and about 700 psia.

16. The method of claim 15 wherein pressure $P_2$ is between about 400 psia and about 800 psia.

17. The method of claim 13 the first component comprises a $C_2$-$C_5$ hydrocarbon, and wherein the second component comprises hydrogen.

* * * * *